United States Patent [19]

Allen

[11] 4,030,124

[45] June 14, 1977

[54] VIDEO DISC PLAYBACK SYSTEM AND PICKUP CARTRIDGE THEREFOR

[75] Inventor: James Austin Allen, Monrovia, Ind.

[73] Assignee: RCA Corporation, New York, N.Y.

[22] Filed: Mar. 16, 1976

[21] Appl. No.: 667,420

[30] Foreign Application Priority Data

Sept. 18, 1975 United Kingdom ............ 38458/75
Nov. 28, 1975 United Kingdom ............ 49108/75

[52] U.S. Cl. ........................ 358/128; 179/100.4 R; 179/100.41 R; 274/37
[51] Int. Cl.² ........................................ H04N 5/76
[58] Field of Search ................ 178/6.6 R, 6.6 DD; 179/100.4 R, 100.41 R, 100.41 S, 100.41 G; 274/37–38, 23

[56] References Cited

UNITED STATES PATENTS

| | | | |
|---|---|---|---|
| 3,873,762 | 3/1975 | Taylor | 178/6.6 A |
| 3,873,783 | 3/1975 | Leedom | 179/100.4 R |
| 3,952,145 | 4/1976 | Allen | 179/100.41 G X |
| 3,952,147 | 4/1976 | Leedom | 178/6.6 R |

*Primary Examiner*—Bernard Konick
*Assistant Examiner*—John H. Wolff
*Attorney, Agent, or Firm*—Eugene M. Whitacre; William H. Meagher; Dilip A. Kulkarni

[57] ABSTRACT

A pickup cartridge encloses a stylus arm carrying a stylus at one end thereof. The other end of the stylus arm is secured to a connector plate via a compliant member. A spring releasably clamps the stylus arm in a retracted position. A pair of elastic straps extend between a pair of spaced end ribs. The rear end of the cartridge has a pair of hooks for releasably retaining the pair of spaced end ribs. The rear surfaces of the elastic straps are at a certain angle with respect to the front surfaces thereof. The connector plate is secured to the slanted rear surfaces of the elastic straps to establish an angular orientation of the connector plate relative to the cartridge so that, when the stylus arm is held in the retracted position in the cartridge, the compliant member is unstressed. The connector plate is adapted to be rotated upon reception of the cartridge in a player to permit the stylus arm to protrude outside the confines of the cartridge without stressing the compliant member. The clamping spring is locatable in one of three positions relative to the cartridge. In the top position, the clamping spring retains the stylus arm in the retracted position against a stop in the cartridge. The middle position of the clamping spring permits the stylus arm to protrude outside the confines of the cartridge. The bottom position is for manufacturing pusposes. Means are provided for accurately positioning the cartridge in a compartment provided in the player.

11 Claims, 23 Drawing Figures

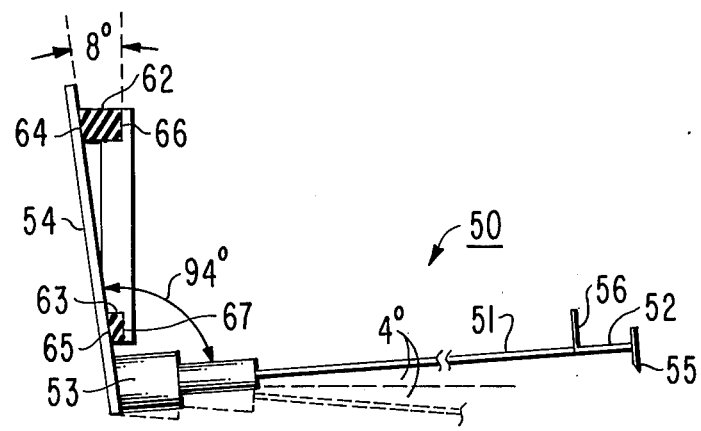
Fig. 4.
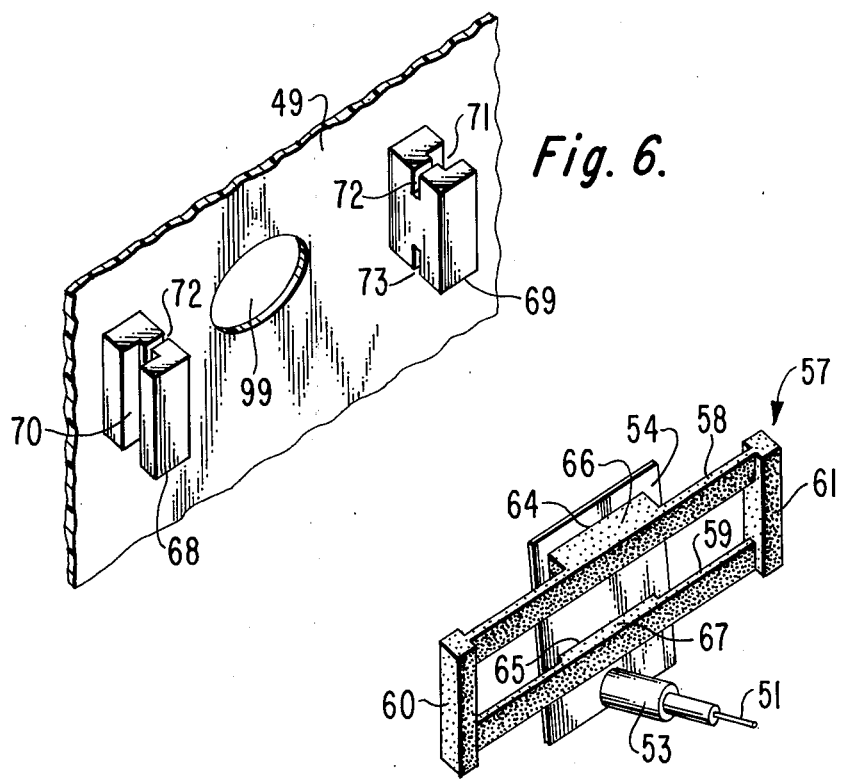
Fig. 6.
Fig. 5.

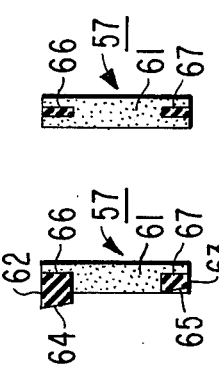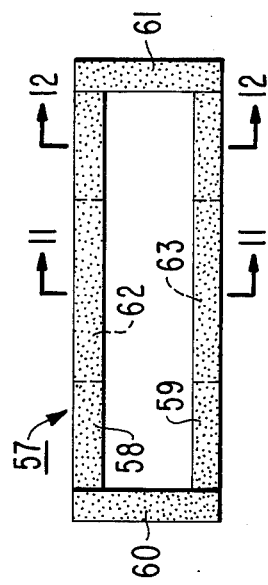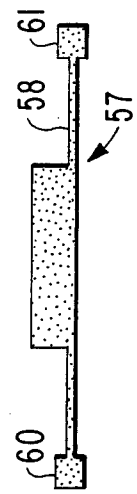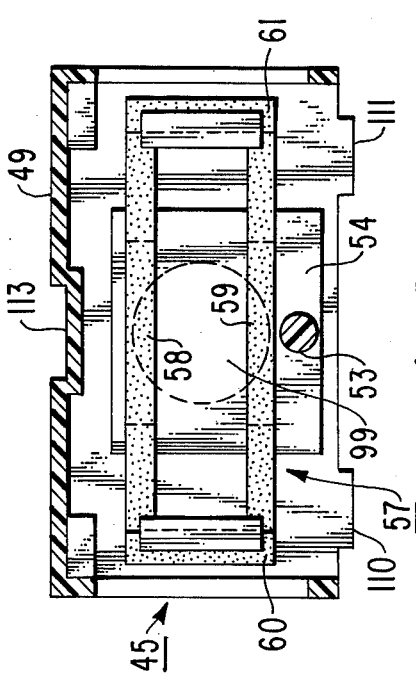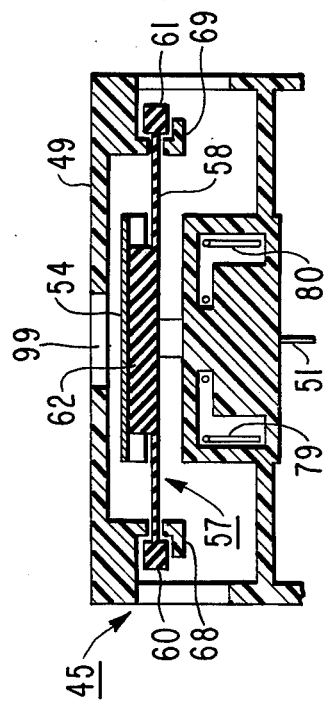

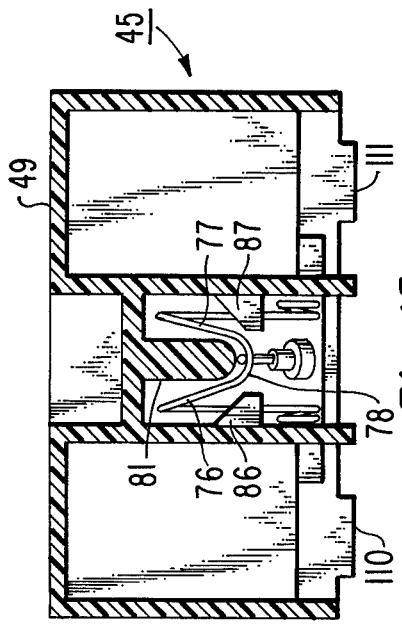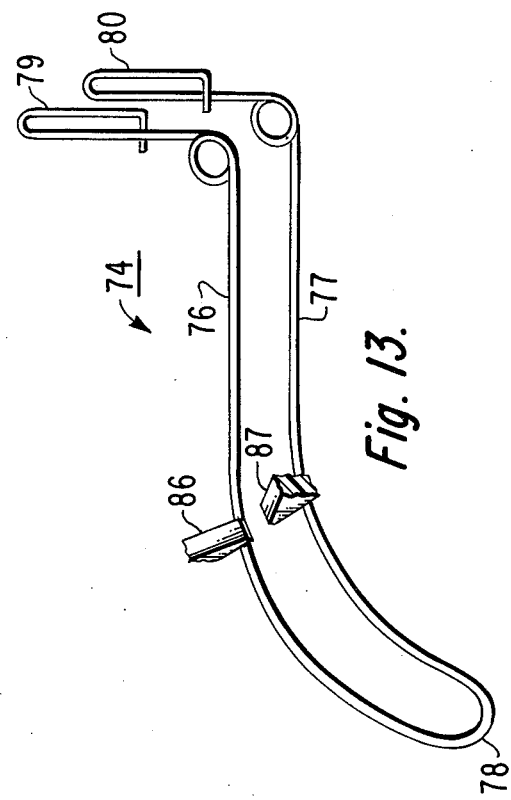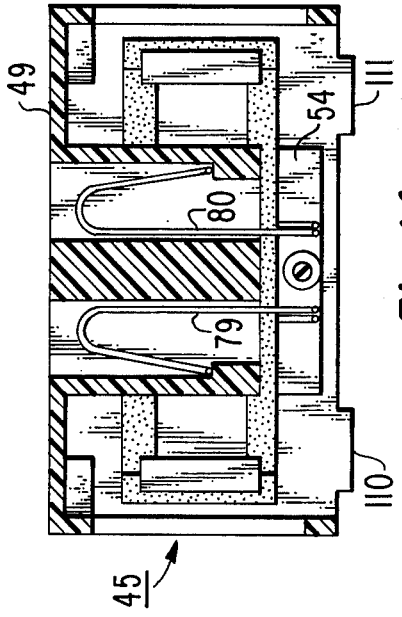

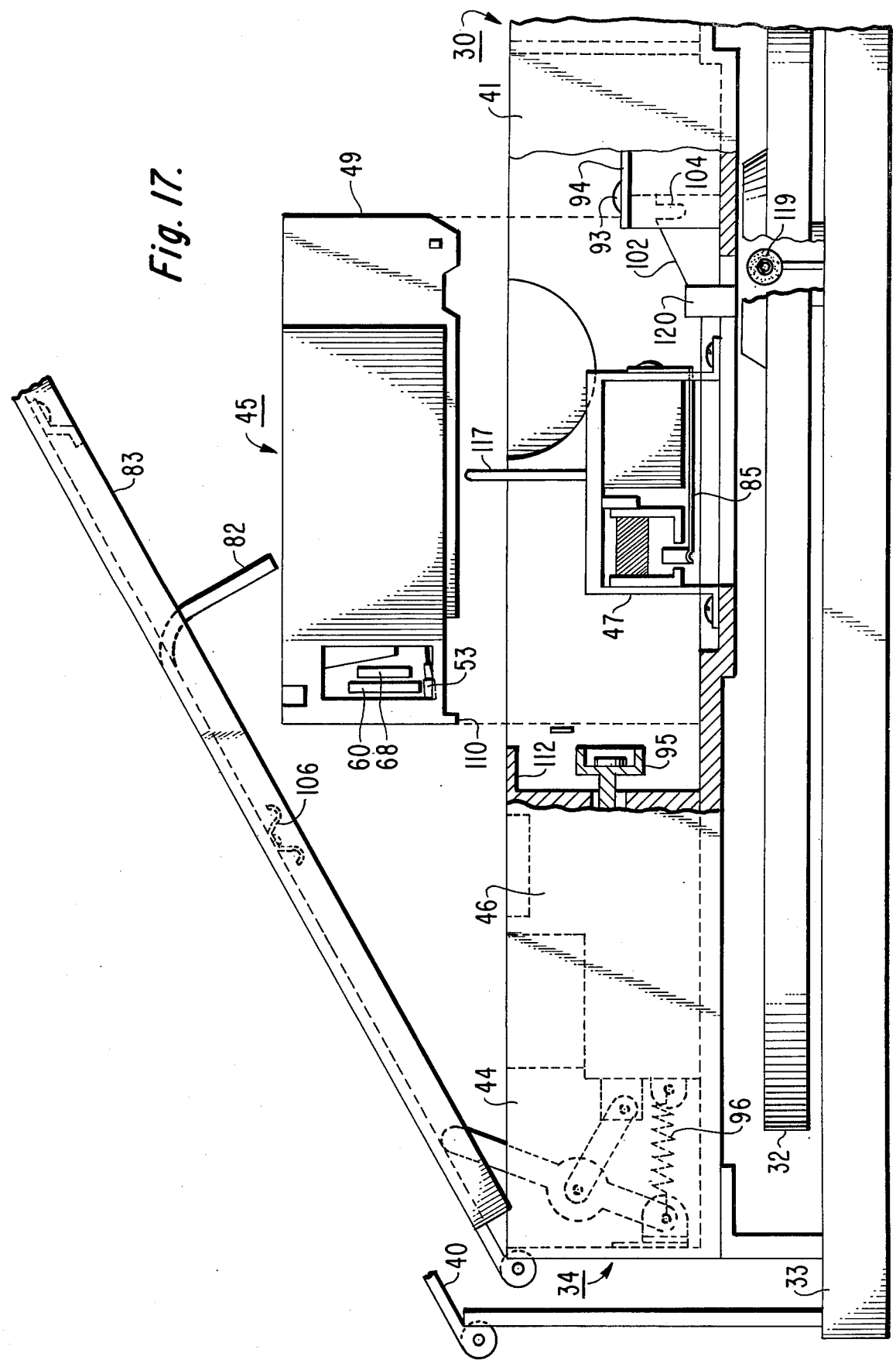

VIDEO DISC PLAYBACK SYSTEM AND PICKUP CARTRIDGE THEREFOR

The invention relates to a cartridge enclosing a stylus arm unit suitable for use in a video disc player.

In a video disc system of the type described in the U.S. Pat. No. 3,842,194, a stylus arm, carrying a stylus at one end and a connector plate secured to its other end via a compliant member, may advantageously be treated as a replaceable unit of a size convenient to handle, whereby when the stylus wear calls for a replacement, the user may readily remove and replace the stylus arm unit without requirements for mechanical skill and dexterity.

In copending U.S. patent applications of (1) M. A. Leedom, Ser. No. 522,815, and (2) J. A. Allen, Ser. No. 522,821, both of these applications being assigned to the assignee of the instant application, replaceable cartridges for enclosing the stylus arm unit are disclosed. In these cartridges, the stylus arm occupies one of the following positions: (a) a retracted storage position outside the player, (b) a retracted off-record rest position while installed in the player, and (c) a protruding above-record play position also while installed in the player. In the retracted positions, the compliant member is stressed and has a tendency to form a permanent "set." Formation of a permanent "set" in the compliant member is undesirable because it may cause stylus mistracking during playback.

In the copending U.S. patent application, Ser. No. 667,308, of M. A. Leedom, entitled, "PICKUP CARTRIDGE," filed concurrently herewith assigned to the assignee of the instant application, a cartridge which overcomes the aforementioned problems is disclosed. The present invention provides improvements in a cartridge of the type disclosed in the concurrently filed Leedom's patent application.

In accordance with the present invention, a cartridge encloses a stylus arm carrying a stylus at one end thereof. A connector plate is secured to the other end of the stylus arm via a compliant member. Means are provided for releasably clamping the stylus arm in a retracted position. The retracted position provides a location for the stylus withdrawn within the confines of the cartridge remote from an opening in the bottom of the cartridge through which the stylus may otherwise protrude. The rear surface of a flexible diaphragm is disposed at a certain angle with respect to the front surface thereof. The cartridge has a bearing surface for securing and locating the front surface of the diaphragm. The connector plate is secured to the rear surface of the diaphragm which establishes an angular orientation of the connector plate relative to the cartridge so that, when the stylus arm is held in the retracted position in the cartridge, the compliant member is unstressed.

In accordance with another feature of the invention, the connector plate is adapted to be rotated upon reception of the cartridge in a player to permit the stylus arm to protrude outside the confines of the cartridge without stressing the compliant member.

In accordance with yet another feature of the invention, the releasable clamping means comprises a spring which is locatable in one of three positions relative to the cartridge. In the top position, the clamping spring retains the stylus arm in the retracted position against a stop in the cartridge. The middle position of the clamping spring permits the stylus arm to protrude outside the confines of the cartridge. The bottom position is for manufacturing purposes.

In accordance with still another feature of the present invention, means are provided for accurately positioning the cartridge in a compartment provided in the player.

In the accompanying drawings:

FIG. 4 is a stylus arm unit enclosed in the cartridge of FIGS. 1-3;

FIGS. 5 and 6 are perspective views showing the details in an arrangement for suspending the stylus arm unit of FIG. 4 in the cartridge of FIGS. 1-3;

FIGS. 7 and 8 are, respectively, the elevation and the plan views, partly in section, of a portion of the cartridge of FIGS. 1-3 showing the suspending arrangement of FIGS. 5 and 6;

FIGS. 9 and 10 are, respectively, the elevation and the plan views of a flexible diaphragm incorporated in the suspending arrangement of FIGS. 5-8;

Figure 1:
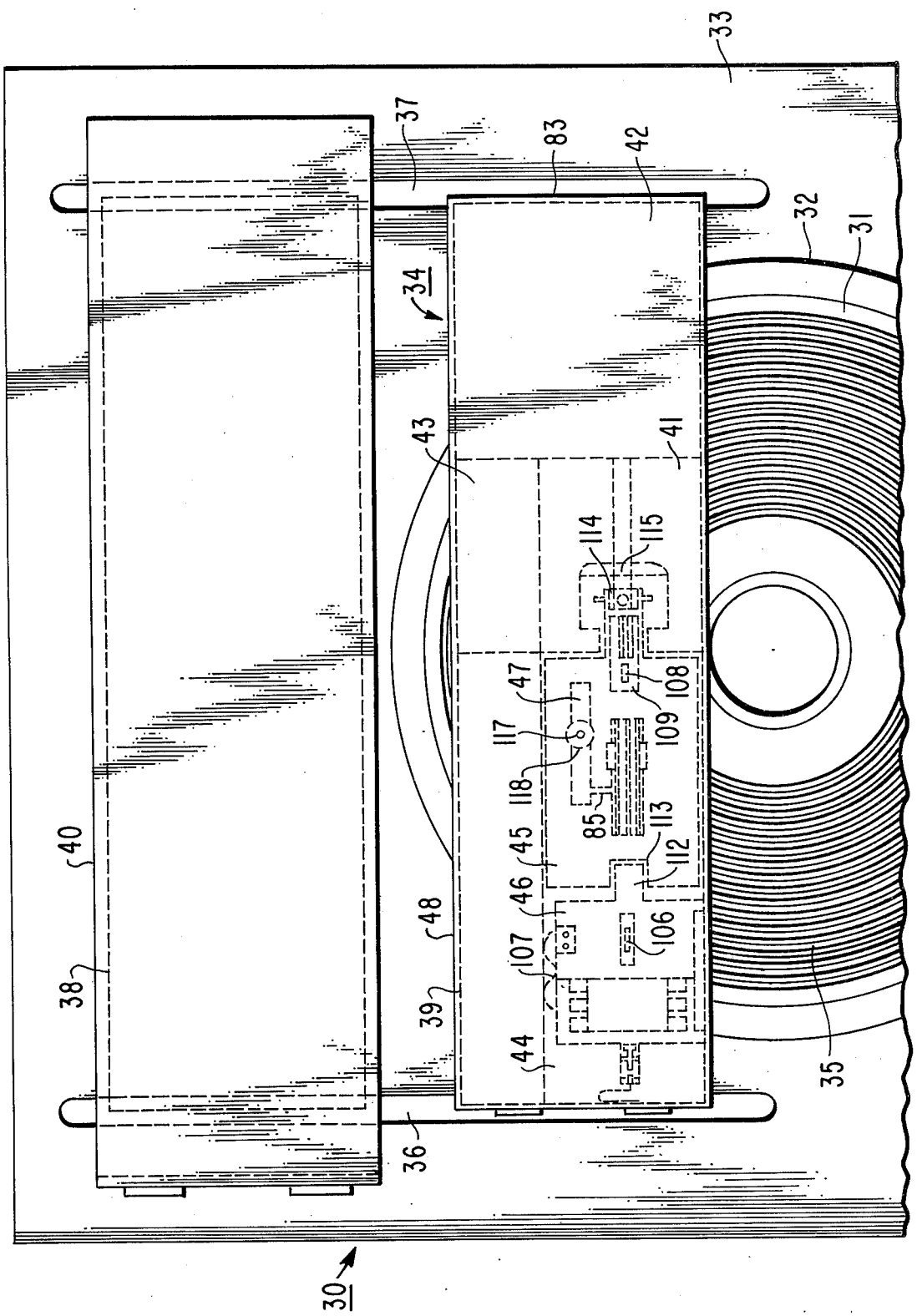
FIG. 1 is a video disc player incorporating a pickup cartridge embodying the present invention.
Figure 3:
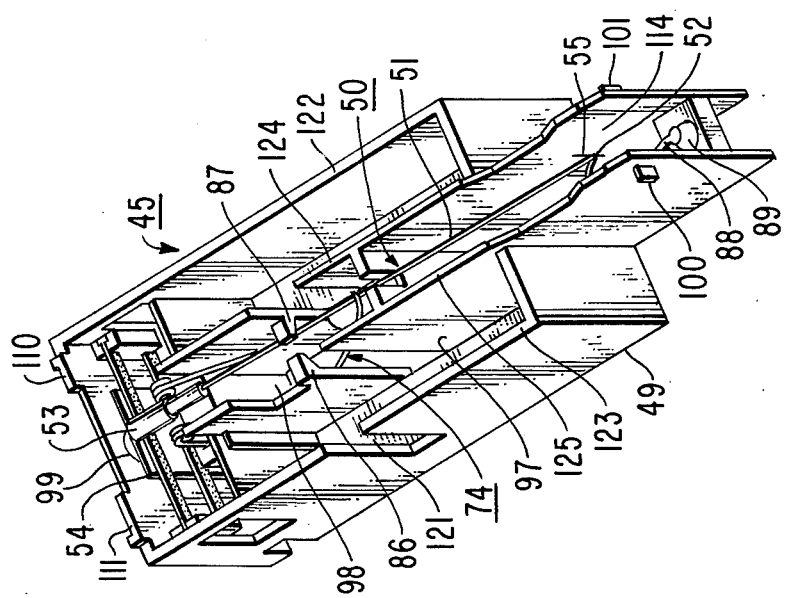
FIGS. 2 and 3 are, respectively, the top and the bottom perspective view of the cartridge of FIG. 1.
Figure 2:
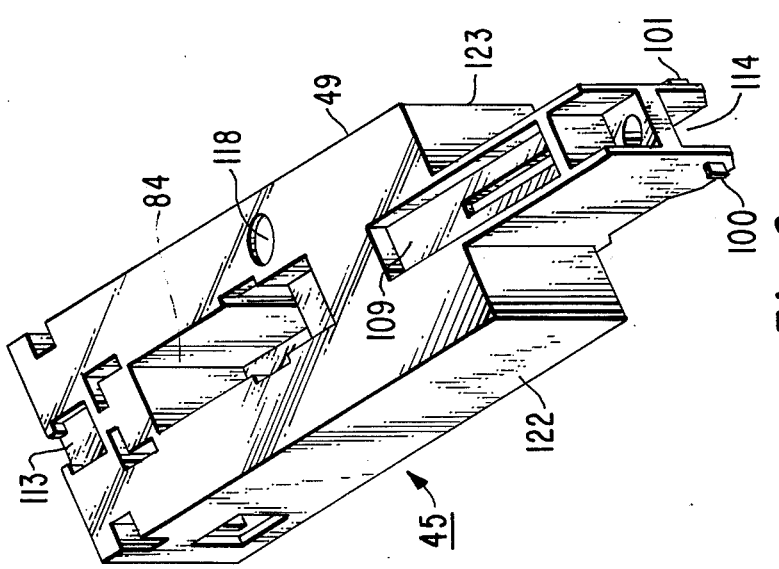

FIGS. 11 and 12 are end views of the diaphragm of FIGS. 9 and 10, respectively, along the section lines 11—11 and 12—12 in FIG. 9;

FIG. 13 illustrates a spring for releasably clamping the stylus arm unit of FIG. 4 in a retracted position in the cartridge of FIGS. 1-3;

FIGS. 14, 15 and 16 illustrate front views of the cartridge of FIGS. 1-3 along various section lines showing the details of the arrangement of the clamping spring of FIG. 13; and FIGS. 17-23 illustrate, a seriatim, operations involved in installing the cartridge of FIGS. 1-3 in the video disc player of FIG. 1.

In FIG. 1, numeral 30 inicates a video disc player of the general type shown in U.S. Pat. No. 3,842,194 (Clemens). A record 31 is disposed for playback on a turntable 32 rotatably mounted on a motorboard 33. A carriage 34 is mounted for lateral motion relative to the motorboard 33 in correlation with lateral motion of a stylus 55 (FIG. 4) riding in a spiral-groove 35 disposed on the surface of the record 31 during playback. Slots 36 and 37 are provided in the motorboard 33 to permit lateral motion of the carriage 34 from an off-record rest position 38 to an above-record play position 39. Reference may be made to the U.S. Pat. No. 3,870,835 (Stave) for illustration of an apparatus for laterally driving the carriage 34 in correlation with the groove-riding stylus 55 during playback. When the carriage 34 is in the off-record rest position 38, a hinged plate 40 conceals the carriage.

There are five basic chambers in the carriage 34. Chambers 41, 42, and 43 are for enclosing respective circuit boards for respective elements of the signal processing circuitry of the playback system: (a) resonator (forming a tuned circuit with the stylus electrode/record capacitance); (b) oscillator (supplying UHF oscillations to the tuned circuit); and (c) preamplifier (responding to the detected version of modulated oscillations derived from the tuned circuit). Chamber 44 contains a replaceable stylus arm cartridge 45, a retractable armstretcher 46, and a stylus arm lifter 47. The armstretcher may be of the type shown in U.S. Pat. No. 3,711,641 (Palmer). The stylus arm lifter 47 may be of the type shown in a copending U.S. patent application, Ser. No. 667,309 of J. Bleazey et al., assigned to the assignee of the instant application referred to subsequently. Chamber 48 forms a wiring channel to hold the lead wires to the various circuit boards.

FIGS. 2 and 3 are the top and bottom perspective views of the cartridge 45. The cartridge 45 includes a body 49 for housing an insert molded stylus arm unit 50 shown in FIG. 4. The insert molded stylus arm unit 50 consists of a stylus arm 51 formed of an aluminum tube (e.g., 0.024 inch outer diameter and 0.002 inch thickness) with a plastic stylus holder 52 glued at one end of the stylus arm and a compliant member 53 molded at the other end of the stylus arm to connect the stylus arm with a metal connector plate 54. The compliant member 53 is in unstressed condition when it is aligned with the stylus arm 51. The angle between the stylus arm 51 and the connector plate 54 is 94° for reasons given subsequently. The plastic stylus holder 52 contains a slot to hold the stylus 55 when it is glued in place. A small projection 56 is molded at the top of the plastic stylus holder 52 to engage with an abutment 120 (FIG. 17) to relieve the stylus 55 from a locked groove. Reference may be made to a copending U.S. patent application Ser. No. 667,308, of M. A. Leedom entitled, "PICKUP CARTRIDGE," filed concurrently herewith, for an example of a locked groove escape arrangement.

The arrangement for suspending the stylus arm unit 50 in the cartridge 45 will now be explained with reference to FIGS. 5–12. As shown in FIG. 5, an elastic diaphragm 57 is glued to the connector plate 54 of the stylus arm unit 50. As shown in FIGS. 9–12, the diaphragm 57, that is presently in use, comprises a pair of elastic straps 58 and 59 joining end ribs 60 and 61. The elastic straps 58 and 59 have central projections 62 and 63 of appropriate wedge shapes providing slanted rear surfaces 64 and 65 to which the connector plate 54 is glued as shown in FIG. 4. The slanted rear surfaces 64 and 65 establish an 8° angle between the connector plate 54 and the forward surfaces 66 and 67 of the elastic straps 58 and 59 for reasons given subsequently.

A pair of hooks 68 and 69 are molded into the rear end of the cartridge body 49 as shown in FIGS. 6–8. In order to secure the diaphragm 57 to the cartridge body 49, the end ribs 60 and 61 are stretched apart and drawn over the hooks 68 and 69. The hooks 68 and 69 have slots 70 and 71 for seating the end ribs 60 and 61 and slots 72 and 73 for seating the elastic straps 58 and 59 as shown in FIG. 6. When the diaphragm 57 is properly secured to the cartridge body 49, the slots 72 and 73 establish an angular orientation of the front surfaces 66 and 67 with respect to the cartridge body 49 (i.e., perpendicular to the bottom surface of the cartridge body).

Figure 22:
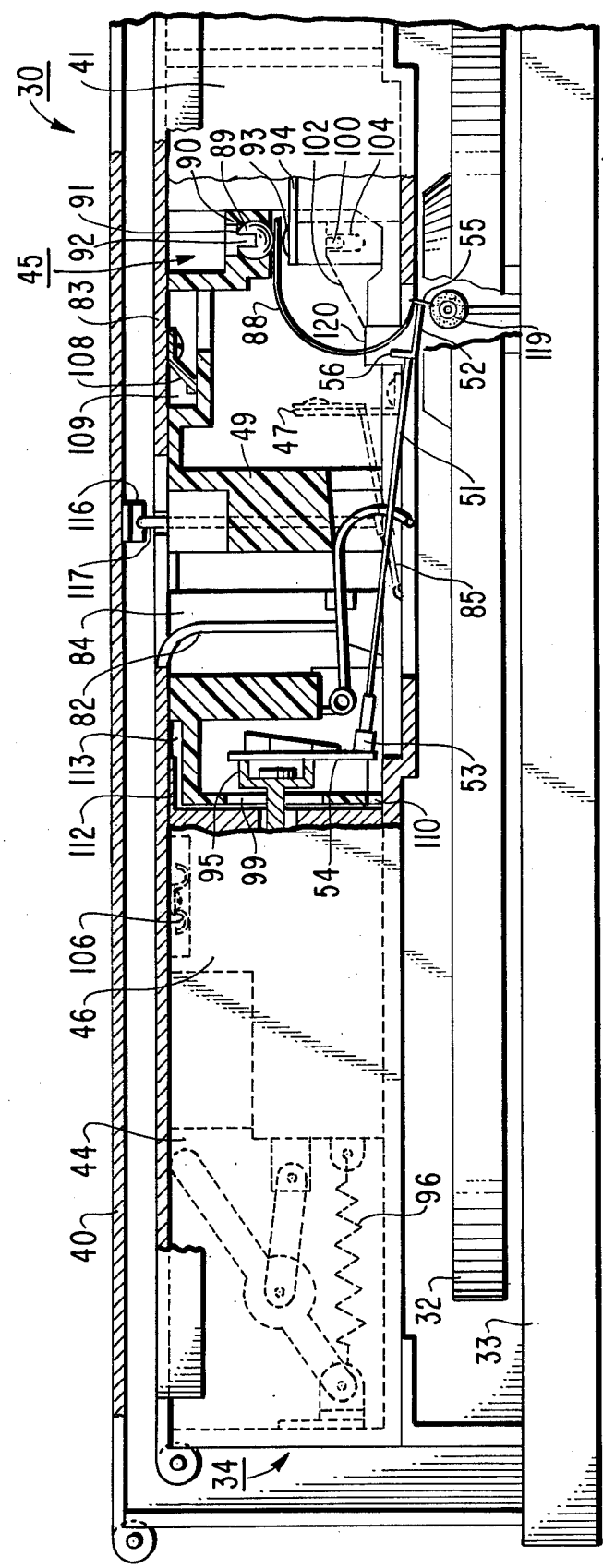
Figure 23:
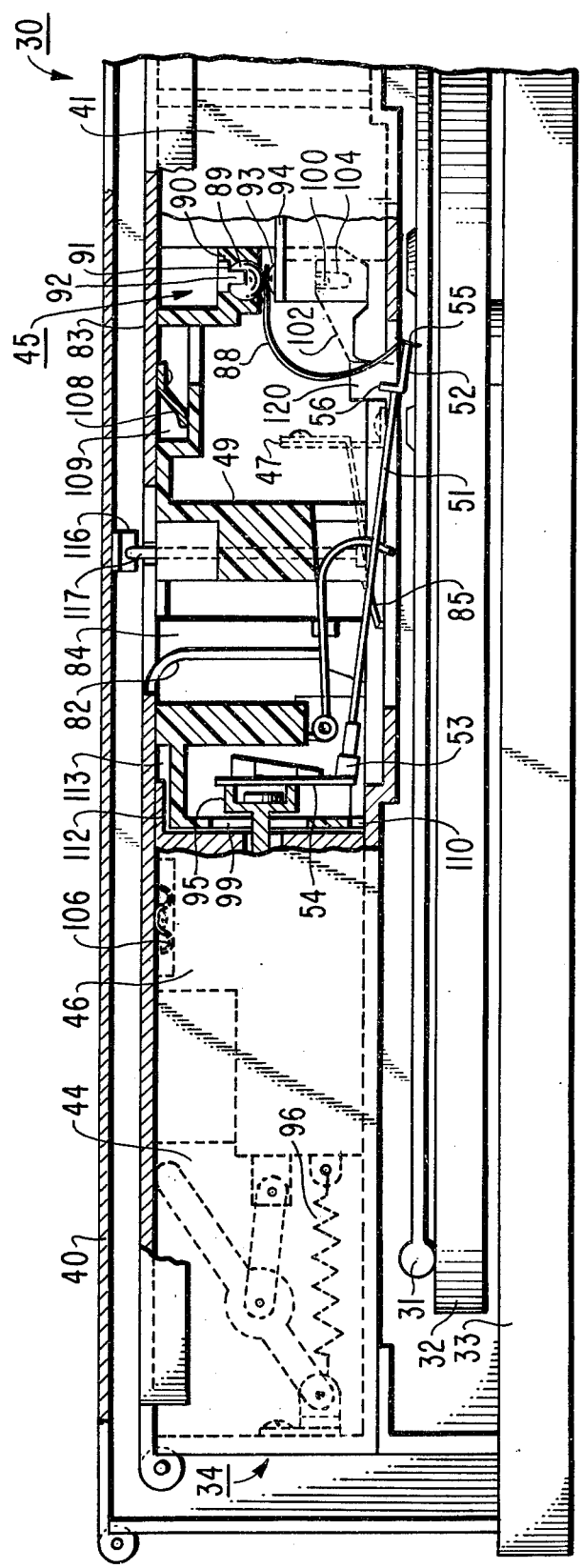

A U-shaped spring 74 (FIG. 13) releasably clamps the stylus arm 51 in a retracted position in the cartridge body 49, as shown in FIGS. 3 and 15, during storage and handling of the cartridge 45 (i.e., outside the player compartment). The retracted position provides a location for the stylus 55 withdrawn within the confines of the cartridge body 49 remote from an opening 75 (FIG. 3) in the cartridge body through which the stylus protrudes when the carriage 34 is in the off-record rest position 38 (FIG. 22) and the above-record play position 39 (FIG. 23).

Figure 18:
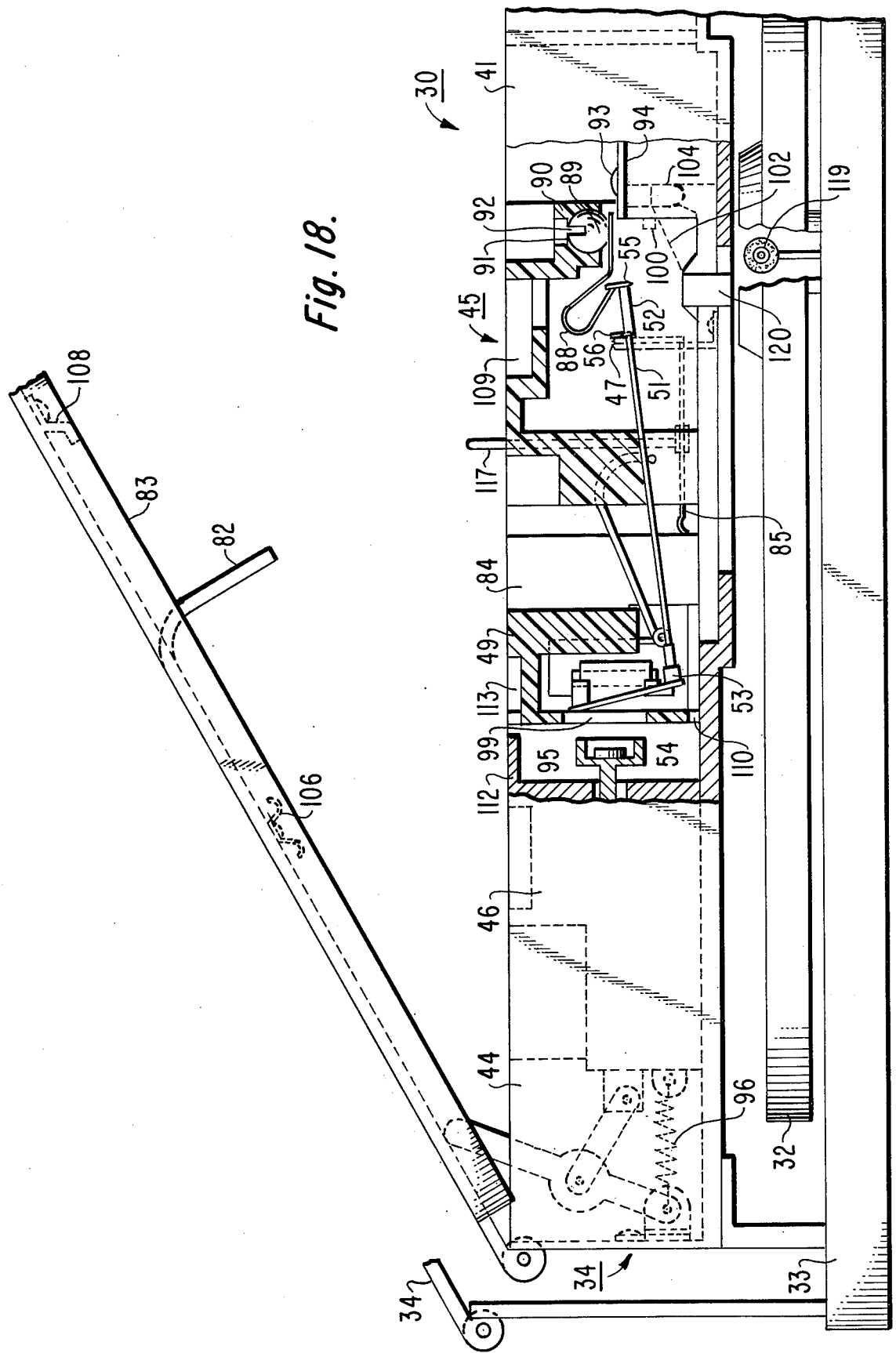
Figure 19:
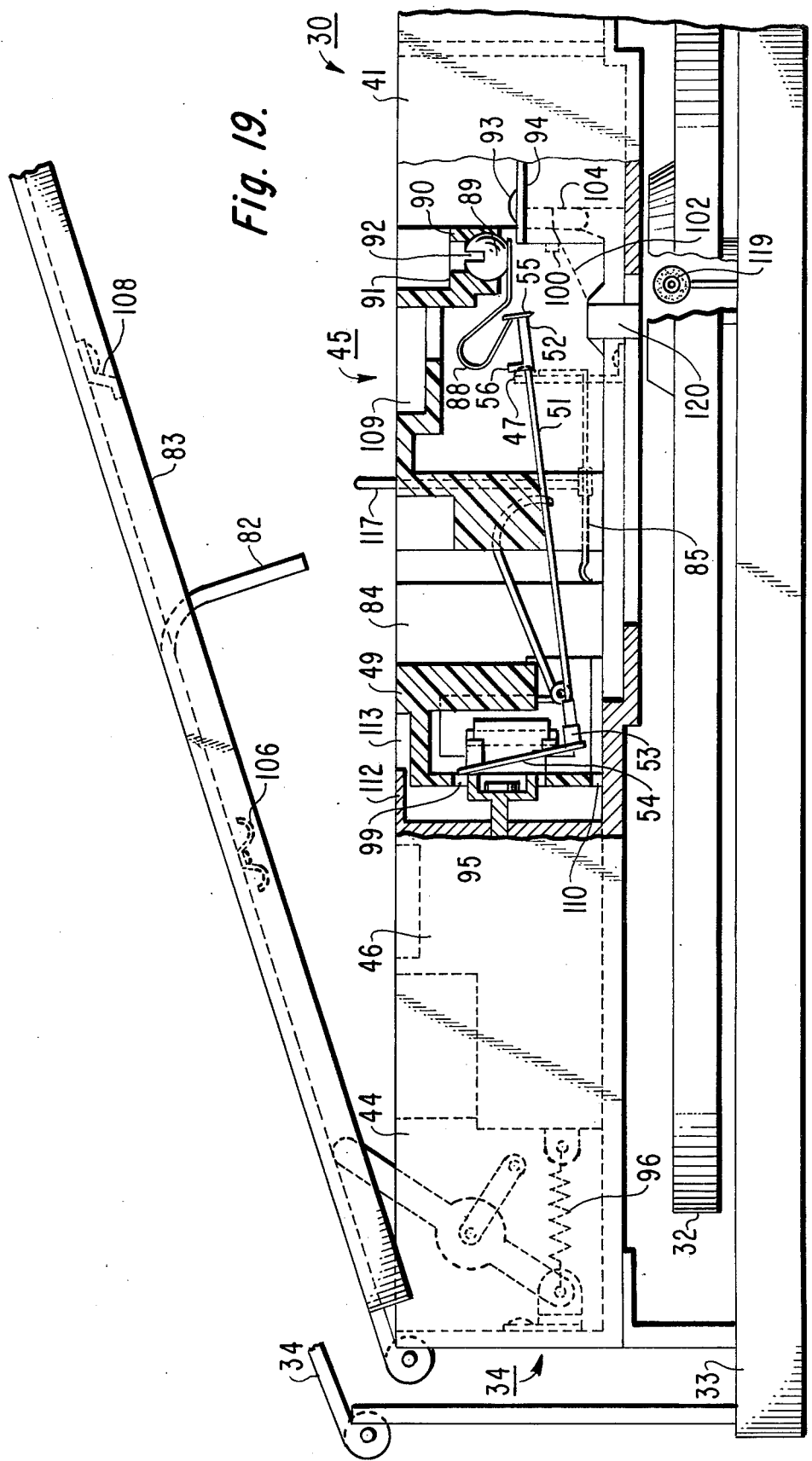

The angular orientation of the front surfaces 66 and 67 (of the elastic straps 58 and 59) relative to the cartridge body 49 (e.g., perpendicular to the bottom surface of the cartridge body), the angular orientation of the connector plate 54 relative to the front surfaces (e.g., 8°), and the angular orientation of the compliant member 53 relative to the connector plate (e.g., 94°) is such that, when the stylus arm 51 is retained in a retracted position in the cartridge body, the compliant member is axially aligned (i.e., relaxed because not bent) with the stylus arm, as shown in FIGS. 18 and 19, although the stylus arm is well up into the cartridge body for protection. Axial alignment of the compliant member 53 with the stylus arm 51 is advantageous because it prevents formation of a "set" in the compliant member during storage and handling of the cartridge 45 which may interfere with ability of the stylus 55 to track the record groove.

The U-shaped spring 74, as shown in FIG. 13, has a pair of spaced leg portions 76 and 77 and a cross portion 78 joining the spaced leg portions. The spaced leg portions 76 and 77 are bent to define an arched portion. End portions 79 and 80 of the spaced leg portions 76 and 77 are secured in the cartridge body 49 as shown in FIGS. 8 and 14.

Figure 20:
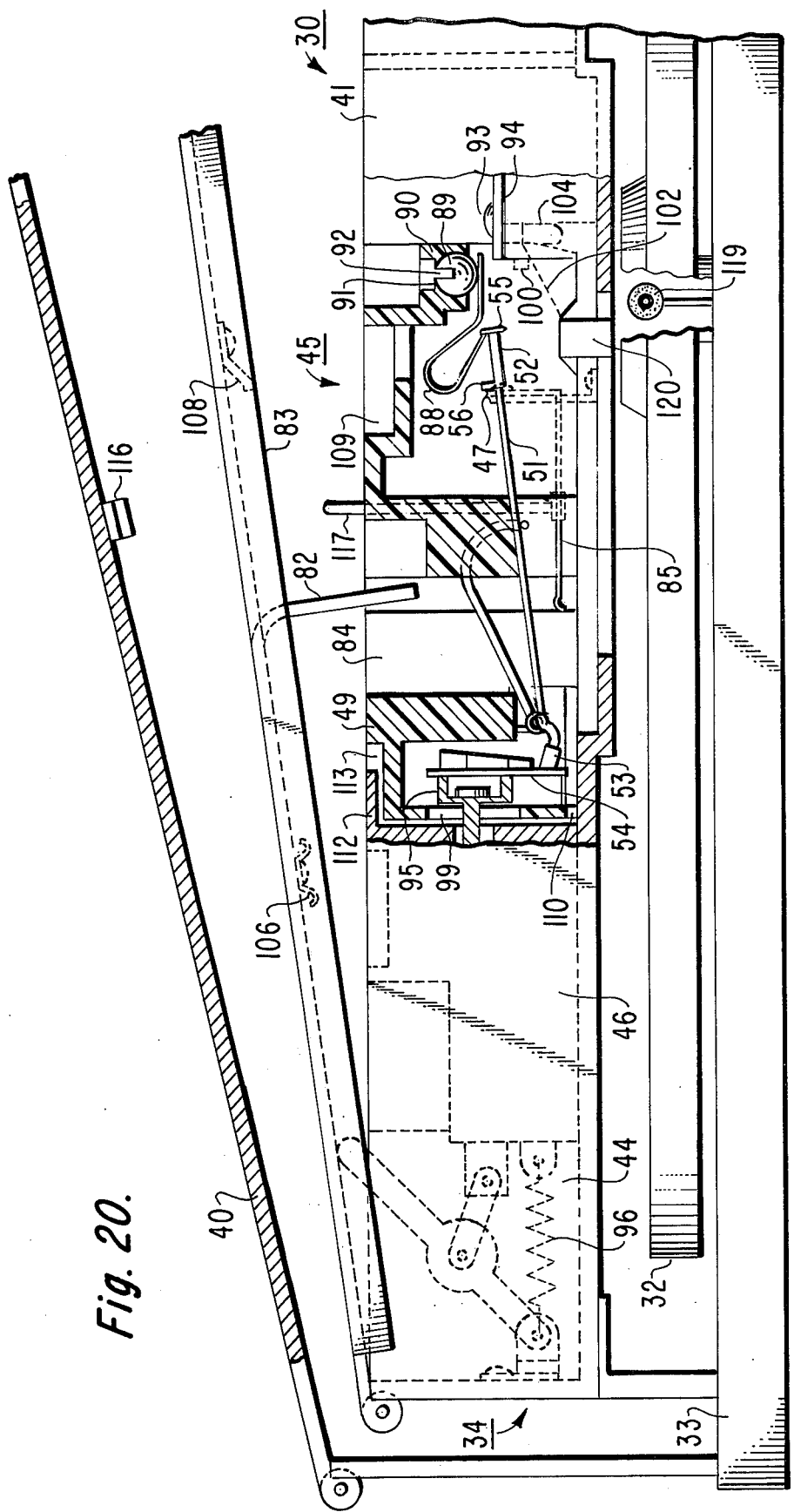
Figure 21:
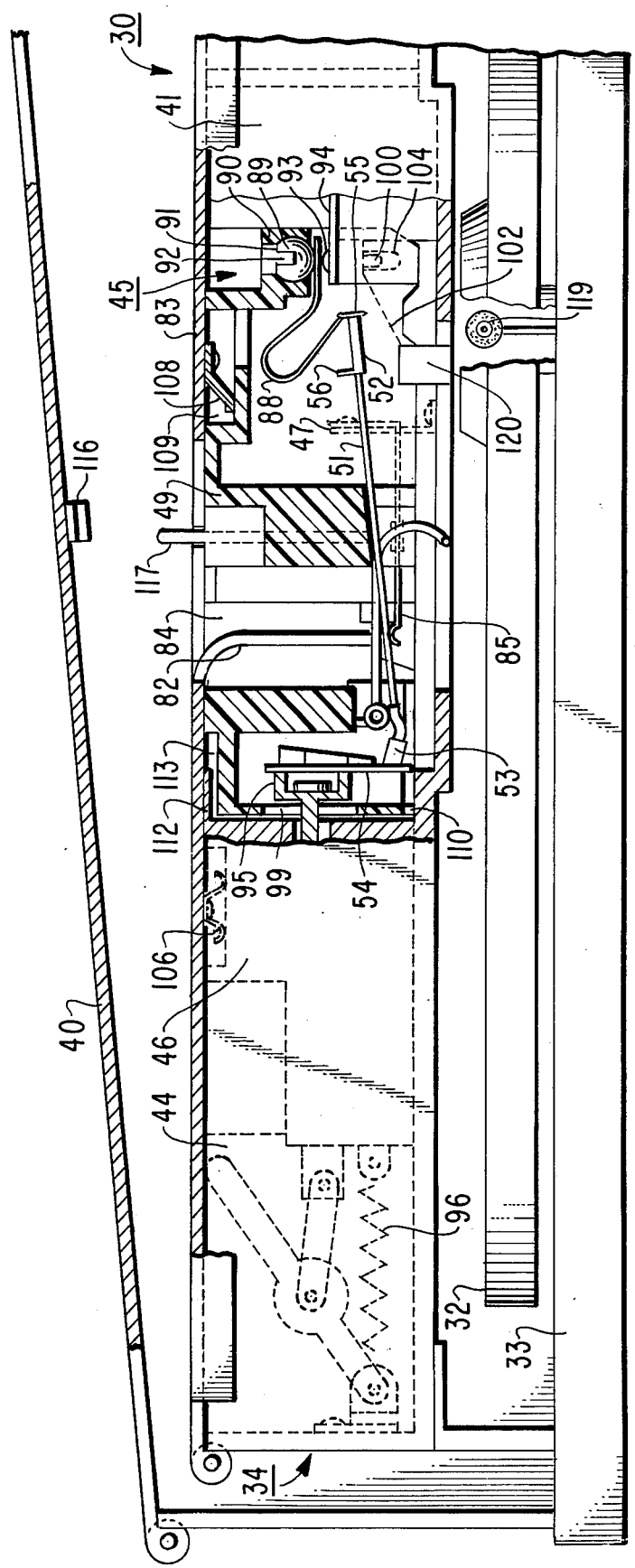

The clamping spring 74 is locatable in one of three positions. In the top position, as shown in FIGS. 15, 18–20, the stylus arm 51 is retained in a retracted position against a stop 81 (FIG. 15). The middle position is caused by depression of the clamping spring 74 by a spring defeat lever 82 of a hinged lid 83 of the carriage 34 when the lid is closed during containment of the cartridge 45 in the compartment 44 as shown in FIGS. 21–23. The defeat lever 82 enters the interior of the cartridge body 49 through an opening 84 in the cartridge body, as shown in FIG. 2, to depress the clamping spring 74. In this position, the clamping spring 74 is completely out of the way of the stylus arm 51 so that a separately controlled rod 85 of the stylus arm lifter 47 (FIGS. 1 and 17) can control the stylus arm during normal play cycles as shown in FIGS. 21–23.

The bottom position is for manufacturing purposes. When the clamping spring 74 is depressed beyond its normal middle position, the spaced leg portions 76 and 77 latch over projections 86 and 87 on the inner walls of the cartridge body 49 as illustrated in FIG. 13 to anchor the clamping spring in a locked position until purposefully released. In this position, the shoe of the stylus 55 can be lapped on a drum lapper, or examined under a microscope without interference from the clamping spring 74.

The arched shape of the clamping spring 74 enables depression thereof by the defeat lever 82 of the lid 83 during containment of the cartridge 45 in the compartment 44 without any interference with the stylus arm 51. Further, the arched shape of the clamping spring 74 permits greater tolerance in the length of the defeat lever 82 without affecting satisfactory operation of the clamping spring defeat mechanism. Additionally, the U-shape of the clamping spring 74 facilitates assembly of the stylus arm unit 50 in the cartridge 45.

The cartridge 45 further includes a leaf spring 88, in the form of a ribbon, for urging the stylus 55 into the record groove 35 during playback as shown in FIG. 23. One end of the leaf spring 88 is secured to the stylus 55. The second end of the leaf spring 88 is secured to a flat on a portion of a ball 89. The ball 89 is friction loaded into a socket 90 provided in the front end of the cartridge body 49 so that the flat of the ball protrudes from the socket. The cartridge body 49 has an access opening 91 in communication with the socket 90 for inserting a tool into a hex-shaped hole 92 provided in the ball 89 for the purpose of adjustment. Such adjustment may, for example, serve to center the stylus arm 51 in the cartridge body 49, to vary the stylus/record tracking pressure, etc. After such adjustment at the factory, the ball 89 may be firmly glued in place.

A copending U.S. patent application, Ser. No. 667,396 of B. K. Taylor, et al., entitled, "STYLUS ADJUSTMENT APPARATUS FOR A VIDEO DISC PLAYER," filed concurrently herewith, assigned to the assignee of the instant application describes such spring adjustment apparatus.

Where the stylus 55 incorporates an electrode for detecting signal variations in the record groove 35 during playback, the leaf spring 88 may be made of conductive material to provide an electrical path between the stylus electrode and the signal processing circuitry. In that case, a contact button 93 may be provided on a resonator circuit board 94 (FIG. 17) for contacting the second end of the leaf spring 88 during containment of the cartridge 45 in the stylus housing compartment 44 as shown in FIGS. 21–23.

A copending U.S. patent application, Ser. No. 667,307 of A. R. Dholakia entitled, "VIDEO DISC PLAYER EMPLOYING A SPRING LOADED STYLUS APPARATUS," filed concurrently herewith, assigned to the assignee of the instant application describes such dual purpose leaf spring apparatus.

FIGS. 17–23 illustrate, a seriatim, operations involved in installation of the cartridge 45 in the compartment 44. From FIG. 17, it can be seen that the armstretcher 46 has a support member 95 for engagement with the connector plate 54 of the cartridge 45 during containment thereof in the compartment 44. The armstretcher 46 is slidably mounted in the compartment 44 for movement between a withdrawn position when the lid 83 is open (FIG. 17) and an advanced position when the lid is closed (FIGS. 21–23) in response to the motion of the lid. The operation of the linkage that moves the armstretcher 46 can be seen from FIGS. 17–23. A coil spring 96 connected between the armstretcher 46 and the carriage 34 returns the armstretcher to the withdrawn position when the lid 83 is opened.

The cartridge 45 is placed in the compartment 44 as shown in FIG. 18, and the lid 83 is closed. The cartridge 45 has a compartment 97 (FIG. 3) which overlies the stylus arm lifter 47 during containment of the cartridge in the compartment 44. An opening 98 (FIG. 3) is provided in the inner wall 125 of the cartridge 45 for permitting manipulation of the stylus arm 51 by the controlled rod 85 of the stylus arm lifter 47.

Initial engagement of the support member 95 with the connector plate 54 can be seen from FIG. 19. The support member 95 enters the interior of the cartridge body 49 through an opening 99 (FIG. 19) for engagement with the connector plate 54. As the armstretcher 46 moves forward, the support member 95 moves the connector plate 54 from initial tilted position (e.g., 8°) to a position matching the engaging surface of the support member (e.g., perpendicular to the bottom surface of the cartridge body 49) as shown in FIG. 20. The elastic diaphragm 57 permits the connector plate 54 to assume the new orientation.

As the lid 83 is closed further, the defeat lever 82 enters the interior of the cartridge body 49 through the opening 84 to depress the clamping spring 74 as shown in FIG. 21. When the clamping spring 74 is depressed, the stylus arm 51 drops downward to rest on the rod 85 of the stylus arm lifter 47.

As the armstretcher 46 moves from the location in FIG. 20 to the location in FIG. 21, the cartridge 45 is pushed forward so that the second end of the leaf spring 88 engages the contact button 93 of the resonator circuit board 94. To prevent shearing motion between the second end at the leaf spring 88 and the contact button 93, the cartridge 45 has a pair of lug portions 100 and 101 at the front end thereof (FIGS. 2–3). The carriage 34 is provided with a pair of ramp portions 102 and 103 (FIG. 17) for engagement with the cartridge lug portions 100 and 101 during the forward motion of the cartridge 45 so that the second end of the leaf spring 74 is lifted away from the contact button 93 during the forward motion. The ramp portions have slots 104 and 105 (FIG. 17) for receiving the lug portions 100 and 101 when the second end of the leaf spring 88 overlies the contact button 93 to establish electrical connection therebetween without undesirable shearing motion.

When the lid 83 is closed, a spring 106, secured to the lid, presses the armstretcher 46 down into the compartment 44 to establish proper seating of the armstretcher as shown in FIG. 21. From FIG. 1, it can be seen that a spring 107, secured to the compartment 44, presses the armstretcher 46 against the sidewall of the compartment to assure lateral alignment of the armstretcher.

Another spring 108, secured to the lid 83, presses against the depressed ledge 109 (FIG. 2) of the cartridge 45, when the lid 83 is closed, to assure proper seating of the cartridge in the compartment 44 and to assure the desired positive contact between the second end of the leaf spring 88 and the contact button 93 as shown in FIG. 21. Further, in order to assure stable mounting of the cartridge 45 in the compartment 44, the cartridge is supported at three points therein. In addition to resting on the contact button 93 of the resonator circuit board 94 at the front end, the cartridge 45 is provided with two feet 110 and 111 at the rear end as shown in FIGS. 3 and 19–23.

In order to assure lateral alignment of the rear end of the cartridge 45 with the armstretcher 46, the armstretcher has a projection 112 which enters a recess 113 provided in the rear end of the cartridge during relative motion between the armstretcher and the cartridge as shown in FIGS. 1 and 19–23.

Further, in order to assure lateral alignment of the front end of the cartridge 45 with the contact button 93, the cartridge has a cavity 114 at the front end for receiving a portion 115 provided in a structure associated with the resonator circuit board 94 during relative motion between the cartridge and the stylus housing 34 as shown in FIG. 1.

When the hinged plate 40 is closed, a projection 116 secured to the hinged plate depresses a plunger 117 connected with the rod 85 of the stylus arm lifter 47. An aperture 118 (FIG. 2) is provided at the top of the cartridge body 49 to permit passage of the plunger 117 as shown in FIG. 1.

When the carriage 34 is in the off-record rest position 38, the stylus 55 rests on a stylus brush 119 upon depression of the lifter rod 85 by the plunger 117 as shown in FIG. 22. Further, when the carriage 34 moves from the off-record rest position 38 to the above-record play position 39, the lifter rod 85 lifts the stylus arm 51 as depression of the plunger 117 is no longer maintained by the projection 116. Again, when the carriage 34 reaches the above-record play position 39, the stylus 55 rests on the record 31 upon activation of the stylus arm lifter 47.

The stylus arm lifting/lowering arrangement may be of the type disclosed in a copending U.S. application, Ser. No. 667,309 of J. Bleazey, et al., entitled; "STYLUS ARM LIFTING/LOWERING APPARATUS FOR A VIDEO DISC PLAYER," filed concurrently herewith.

When the stylus 55 is resting on the stylus brush 119 or the record 31, the compliant member is not bent or stressed. This feature prevents formation of a set in the compliant member during containment of the cartridge 45 in the compartment 44 under rest conditions. Thus, compliant member is in unstressed condition while the cartridge is outside the carriage compartment, and also while the cartridge is contained in the compartment and the carriage is in the off-record rest position or in the above-record play position. The compliant member is stressed only in the interval between the off-record rest position and the above-record play position of the carriage as the stylus arm is lifted to permit the stylus to clear the outside bead of the record. This interval is so short that it has no noticeable effect on the "set" of the compliant member.

An aperture 121 (FIG. 3) in the outer wall 123 of the cartridge 45 permits passage of wiring between the stylus arm lifter 47 and the wiring channel 48. The cartridge 45 is provided with inner walls 124 and 125 closely flanking the stylus arm unit 50 to limit access thereto. The keyed end shape and the solid cover of the cartridge 45 prevents backward or inverted insertion of the cartridge into the compartment 44.

What is claimed is:

1. In a system for playing back prerecorded signals from a spirally grooved and rotatable record; said system including a carriage mounted for lateral motion relative to a base plate of said system in correlation with lateral motion of a groove-riding stylus during playback; said system further including a support member located within said carriage; an apparatus comprising:
   A. a stylus arm unit including:
      a. a stylus arm carrying said stylus at one end thereof.
      b. a connector plate; and
      c. a compliant member securing said connector plate to the other end of said stylus arm;
   B. a cartridge having walls defining a protective enclosure for said stylus arm unit; said cartridge being subject to reception in a compartment provided in said carriage;
   C. means for releasably clamping said stylus arm in a retracted position in said cartridge; said retracted position providing a location for said stylus withdrawn within the confines of said cartridge remote from an opening in the bottom of said cartridge through which said stylus may otherwise protrude;
   D. means for flexibly suspending said connector plate within said cartridge; said suspending means establishing a location of said connector plate permitting alignment thereof with said support member when said cartridge is received in said compartment; said suspending means including a flexible diaphragm; said suspending means further including means for securing said diaphragm to said cartridge; a rear surface of said flexible diaphragm being oriented at a certain angle with respect to a front surface of said flexible diaphragm; said connector plate being secured to said rear surface; said cartridge having a bearing surface for engagement with said front surface to establish location of said front surface in said cartridge; and said certain angle being such that said compliant member is unstressed when said stylus arm is retained in said retracted position in said cartridge during said engagement of said front surface of said diaphragm with said bearing surface of said cartridge.

2. An apparatus as defined in claim 1 wherein said flexible diaphragm comprises a plurality of elastic straps joining a pair of spaced ribs; wherein said means for securing said diaphragm to said cartridge comprises a pair of spaced hooks for retaining said spaced pair of ribs; the back surfaces of said elastic straps defining said rear surface oriented at said certain angles with respect to said front surface defined by the forward surfaces of said elastic straps.

3. An apparatus as defined in claim 2 wherein the angular orientation of said connector plate with respect to said cartridge, when said connector plate is rigidly engaged with said support member during containment of said cartridge in said compartment, and the angular orientation of said compliant member with respect to said connector plate, are such that said compliant member is unstressed when said protrusion of said stylus through said opening is effected by release of said clamping means during said engagement of said connector plate and said support member.

4. An apparatus as defined in claim 3, for use in playing back prerecorded video signals further including means for causing lateral motion of said carriage in correlation with, but independent of, the lateral motion of said groove-riding stylus due to said spiral groove so that said stylus arm is maintained substantially tangential to said spiral groove at the point of stylus/groove engagement; and means mounted in said carriage for causing cyclical motion of said support member during said rigid engagement with said connector plate for varying the position of said stylus along said spiral groove during playback in a manner that opposes deviations of stylus/groove relative speed from a predetermined speed.

5. An apparatus as defined in claim 4 including means for providing relative displacement between said cyclical motion causing means and said cartridge to effect said rigid engagement between said connector plate and said support member; and wherein said cyclical motion causing means has a portion subject to engagement with a cooperating portion provided in said cartridge for laterally aligning said cartridge with respect to said cyclical motion causing means during said relative displacement.

6. An apparatus as defined in claim 1 wherein said releasable clamping means comprises a U-shaped spring; said U-shaped spring having a pair of spaced leg portions and a cross portion joining said spaced leg portions; said spaced leg portions defining an arched portion; the end portions of said spaced leg portions being secured in said cartridge so that the apex of said arched portion is located away from said opening in the bottom of said cartridge through which said stylus may protrude; and said stylus arm resting on said cross portion and nesting between said spaced leg portions when said stylus arm is retained in said retracted position.

7. An apparatus as defined in claim 6 wherein said carriage has a lid for enclosing said compartment; and wherein a spring defeat lever is secured to said lid; wherein the location of said defeat lever relative to said carriage is such that said defeat lever depresses said arched portion of said clamping spring to a depressed location to release said stylus arm from said retracted position when said lid is closed during containment of said cartridge in said compartment.

8. An apparatus as defined in claim 7 wherein said cartridge is provided with a pair of spaced anchor portions for engagement with said spaced leg portions of said clamping spring when said arched portion is further depressed beyond said depressed location to permit retention of said clamping spring in a locked location.

9. A cartridge for use in a system for playing back prerecorded signals from a grooved record; said cartridge comprising:
   A. a stylus arm unit including:
      a. a stylus
      b. a stylus arm carrying said stylus at one end thereof
      c. a connector plate; and
      d. a compliant member securing said connector plate to the other end of said stylus arm;
   B. a cartridge body having walls defining a protective enclosure for said stylus arm unit;
   C. means for releasably clamping said stylus arm in a retracted position in said cartridge body; said retracted position providing a location for said stylus withdrawn within the confines of said cartridge body remote from an opening in the bottom of said cartridge body through which said stylus may otherwise protrude;
   D. means for flexibly suspending said connector plate within said cartridge body; said suspending means including a flexible diaphragm, and means for securing said diaphragm to said cartridge body; rear surface of said flexible diaphragm being slanted with respect to a front surface of said flexible diaphragm; said connector plate being secured to said rear surface; said cartridge body having a bearing surface for engagement with said front surface of said diaphragm during clamping of said stylus arm; and the slant of said rear surface being such that said compliant member is unstressed when said stylus arm is retained in said retracted position in said cartridge body during said engagement of said front surface of said diaphragm with said bearing surface of said cartridge body.

10. A cartridge as defined in claim 9 wherein said releasable clamping means comprises a U-shaped spring; said U-shaped spring having a pair of spaced leg portions and a cross portion joining said spaced leg portions; said spaced leg portions defining an arched portion; the end portions of said spaced leg portions being secured in said cartridge body so that the apex of said arched portion is located away from said opening in the bottom of said cartridge body; and said stylus arm resting on said cross portion and nesting between said spaced leg portions when said stylus arm is retained in said retracted position.

11. A cartridge as defined in claim 10 wherein said cartridge body is provided with a pair of spaced anchor portions for engagement with said spaced leg portions of said clamping spring when said arched portion is sufficiently depressed toward said opening, to permit retention of said clamping spring in a locked location.

* * * * *